INVENTOR.
DWIGHT A. GARRETT
BY
ATTORNEYS

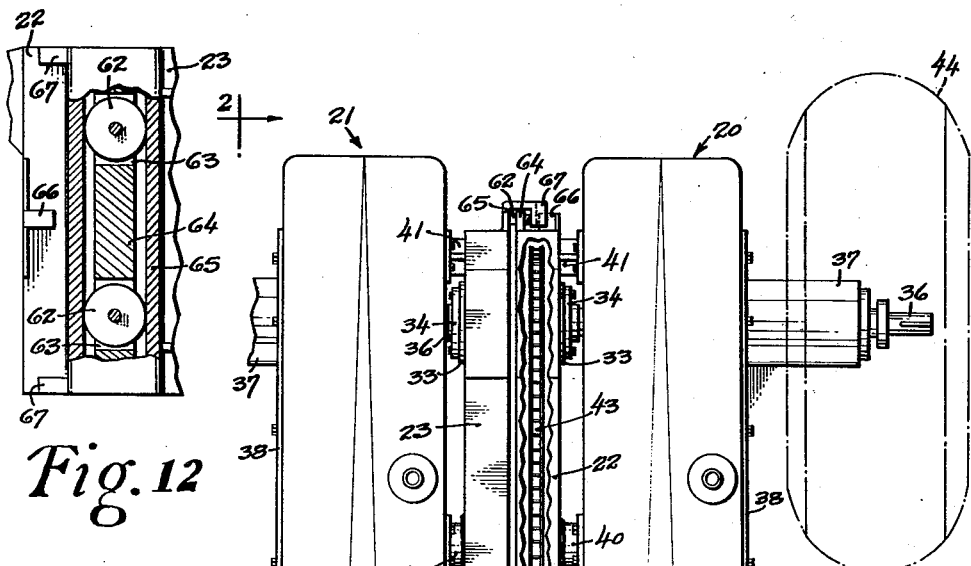
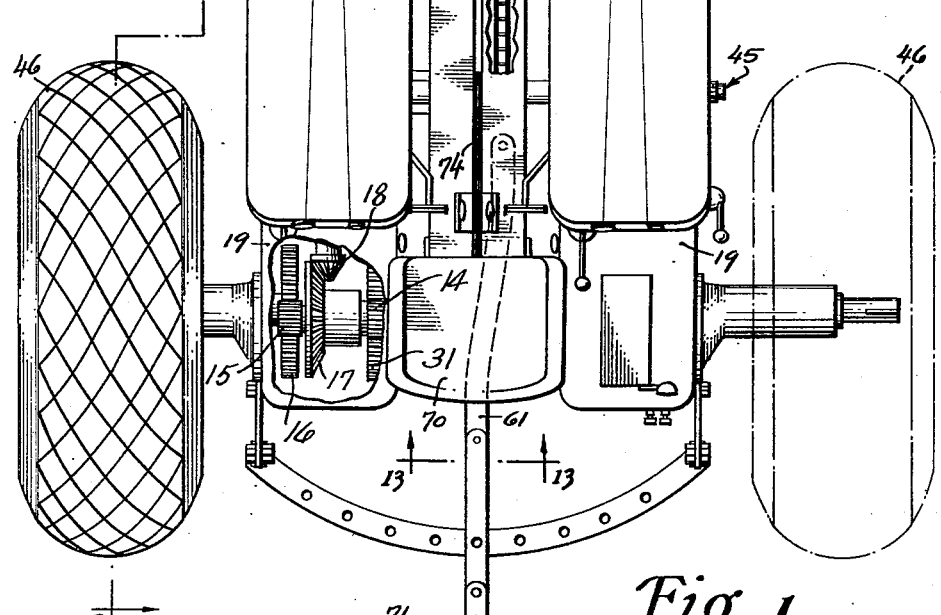
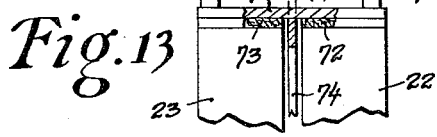
Fig. 12
Fig. 13
Fig. 1
INVENTOR.
DWIGHT A. GARRETT
BY
ATTORNEYS Oct. 1, 1957 D. A. GARRETT 2,808,117
YOKED SPAN OF TRACTORS
Filed Aug. 29, 1955 4 Sheets-Sheet 2

Oct. 1, 1957    D. A. GARRETT    2,808,117
YOKED SPAN OF TRACTORS
Filed Aug. 29, 1955    4 Sheets-Sheet 3
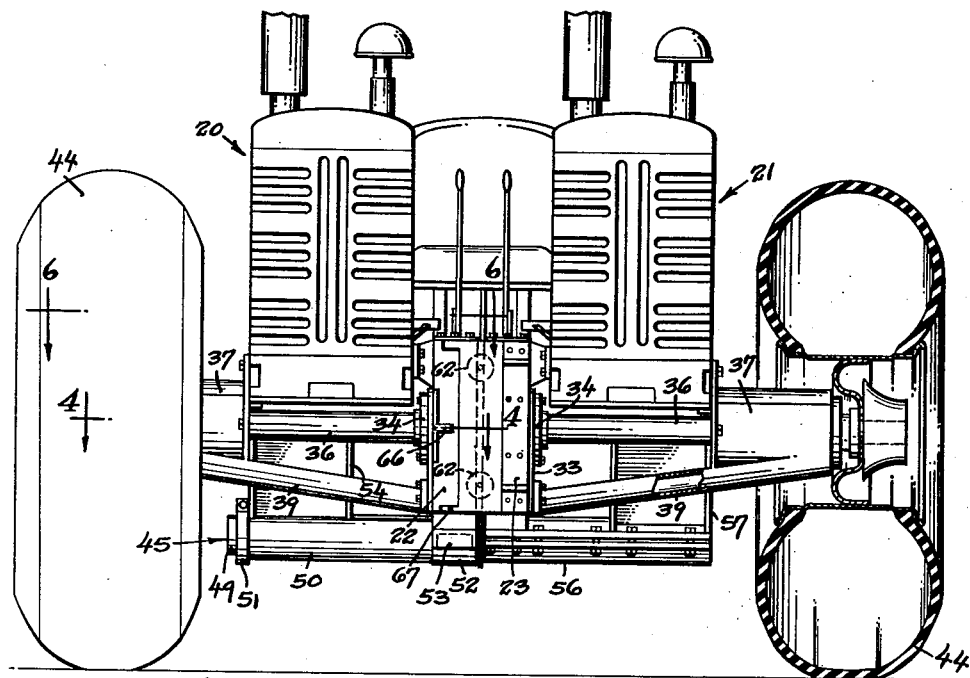
Fig. 3
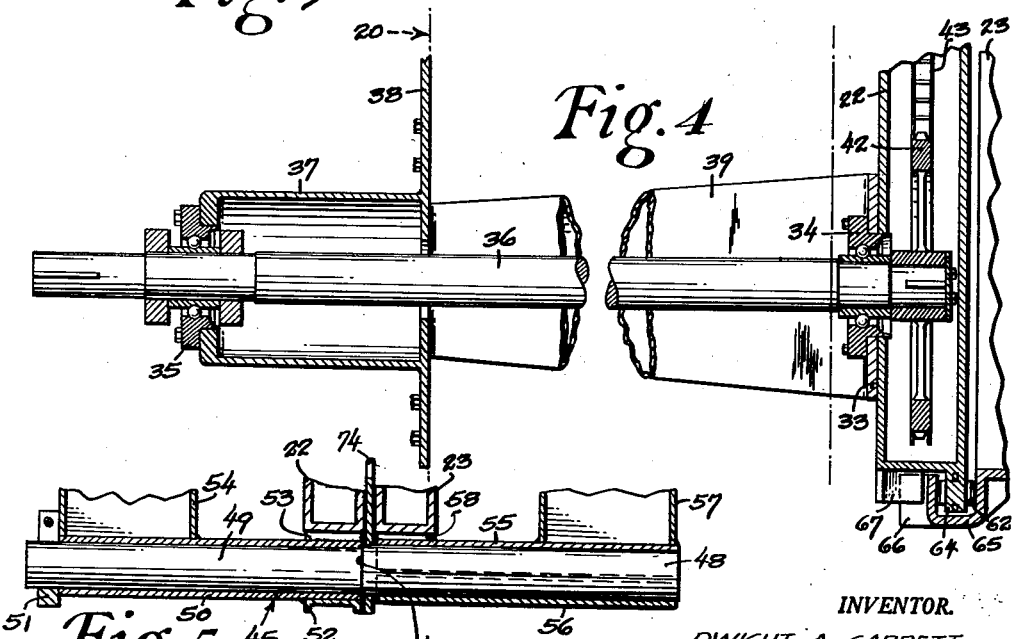
Fig. 4
Fig. 5
INVENTOR.
DWIGHT A. GARRETT
BY
ATTORNEYS Oct. 1, 1957      D. A. GARRETT      2,808,117
YOKED SPAN OF TRACTORS
Filed Aug. 29, 1955      4 Sheets-Sheet 4
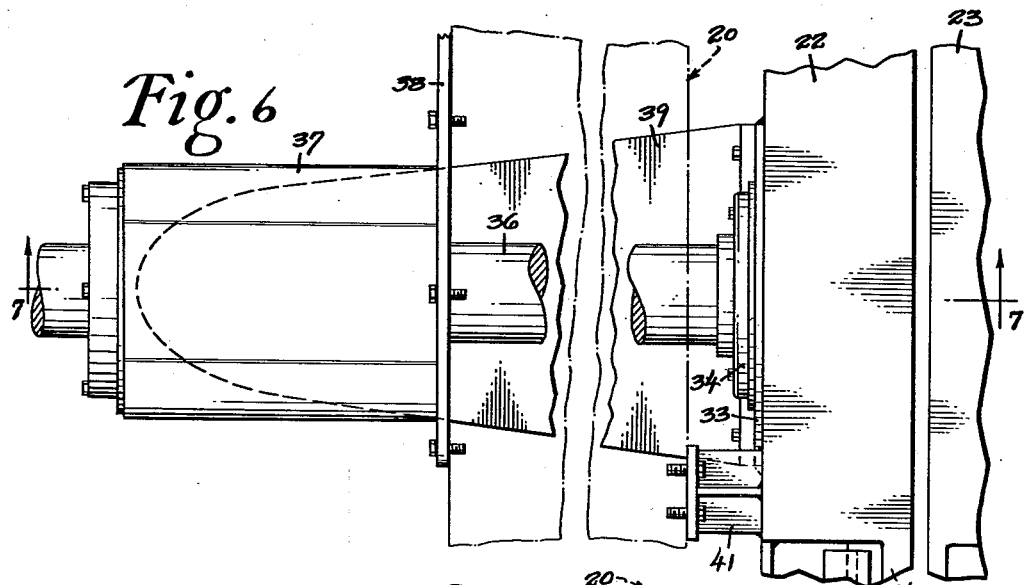
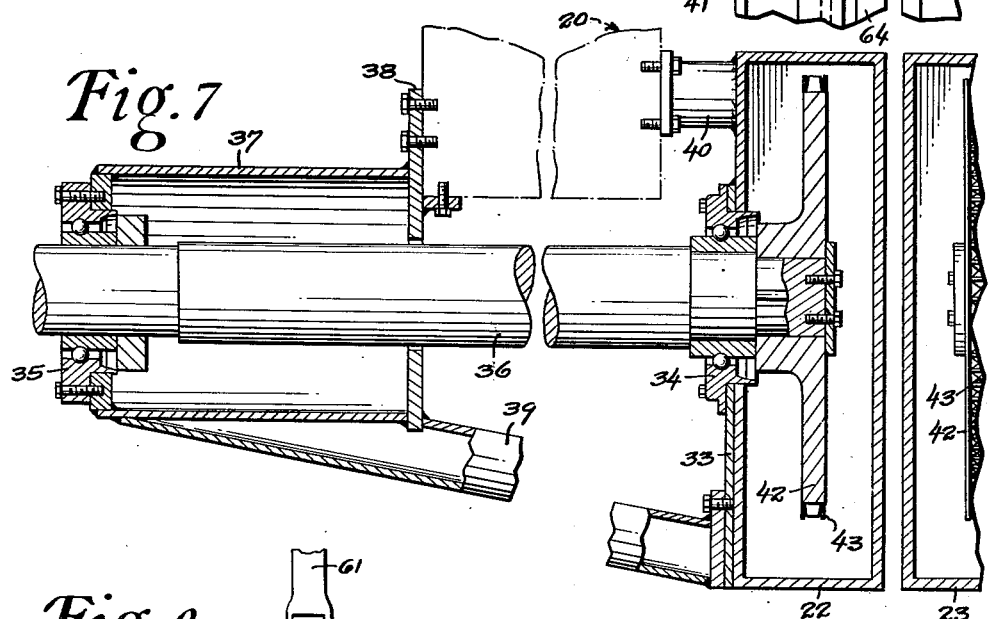
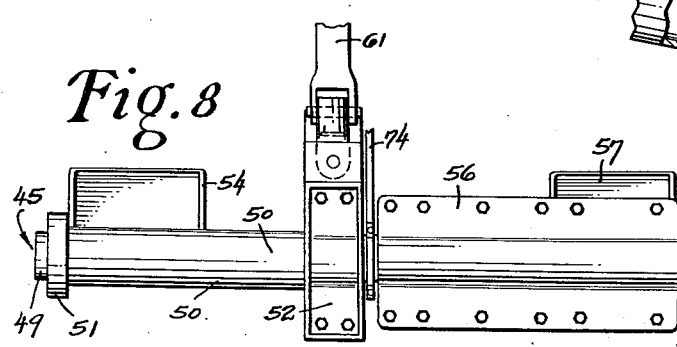
INVENTOR.
DWIGHT A. GARRETT
ATTORNEYS

United States Patent Office 2,808,117
Patented Oct. 1, 1957

2,808,117

YOKED SPAN OF TRACTORS

Dwight A. Garrett, Enumclaw, Wash.

Application August 29, 1955, Serial No. 530,943

17 Claims. (Cl. 180—6.48)

This invention relates to tractors, and especially wheeled tractors of the type illustrated and described in my pending application for patent filed December 31, 1954, Ser. No. 479,159, namely a tractor having two engines each independent of the other and with the wheels at one side of the tractor driven by one of such engines and with the wheels at the other side of the tractor driven by the other engine.

The present invention, as with the invention of my above-identified pending application, is concerned with the conversion of standard wheeled tractors of the type having driven rear wheels and steerable front wheels, and aims to provide a perfected conversion technique, lending itself especially to heavy-duty tractors, in which two such tractors of standard construction can be coupled one alongside the other so as to produce a substantial yoked "span" having wheels only upon the outside and with the steerable front wheels replaced by non-steerable traction wheels, the conversion structure relying for its steering movements upon selective braking or acceleration in the manner commonly associated with crawler-type tractors.

Other more particular objects and advantages in view will, with the foregoing, appear and be understood in the course of the following description and claims, the invention consisting in the novel construction and in the adaptation and combination of parts hereinafter described and claimed.

In the accompanying drawings:

Figure 1 is a top plan view, with parts broken away, illustrating a yoked span of tractors converted from two standard heavy-duty units in accordance with the preferred teachings of the present invention.

Fig. 3 is a front elevational view of the yoked span with parts broken away and shown in section.

Fig. 4 is a fragmentary enlarged-scale horizontal sectional view drawn on line 4—4 of Fig. 3.

Fig. 5 is a fragmentary large-scale transverse vertical sectional view drawn on line 5—5 of Fig. 2.

Fig. 6 is a fragmentary top plan view of the structure shown in Fig. 2, drawn to an enlarged scale.

Fig. 7 is a transverse vertical sectional view on line 7—7 of Fig. 6.

Fig. 8 is a fragmentary underside plan view, and Fig. 9 is a perspective view, of the structure shown in Fig. 5.

Fig. 10 is a longitudinal vertical sectional view drawn to an enlarged scale on line 10—10 of Fig. 9.

Fig. 11 is a fragmentary horizontal sectional view on line 11—11 of Fig. 2.

Fig. 12 is a fragmentary large-scale front elevational view detailing means provided at the front end of the structure for guiding the yoked tractor units as the same partake of relative oscillatory motion; and Fig. 13 is a fragmentary large-scale transverse vertical sectional view on line 13—13 of Fig. 1 detailing the mounting for the driver's seat.

Figure 2:
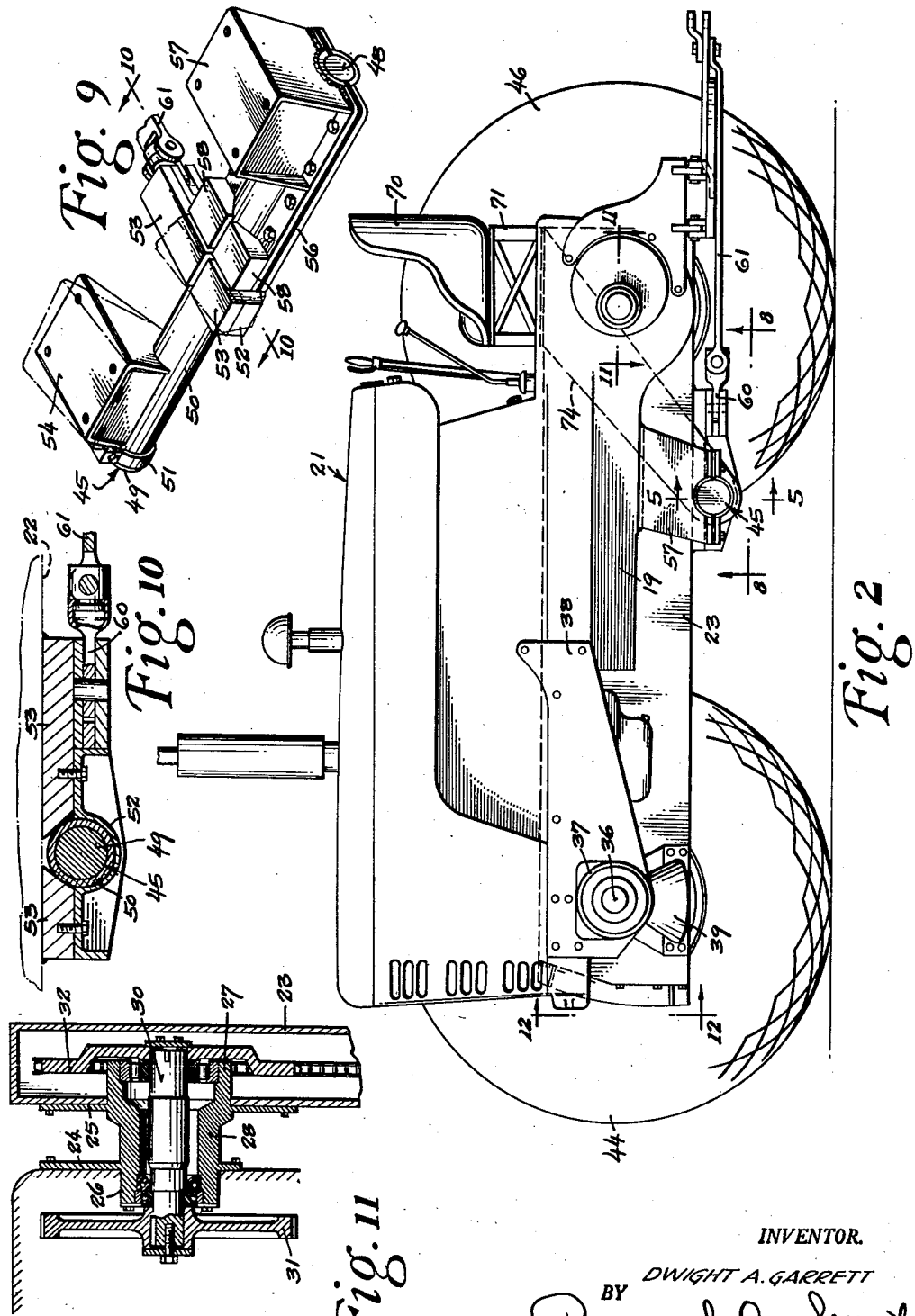
Fig. 2 is a side elevational view thereof with the near ground wheels removed.

The two tractors which I convert in producing the present yoked span are each a standard wheeled unit with steerable ground wheels at the front and traction ground wheels at the rear. The engine compartment lies at the front, and the frame of the vehicle includes a hollow case 19 which extends rearwardly on the tractor's longitudinal median line as a prolongation of the engine's clutch housing. At the rear end of this hollow case and connected therewith is a transmission housing, and to the immediate rear of this transmission housing is a differential housing. Final drives carry the drive laterally to the rear traction wheels. A brake is provided for each traction wheel, and there is provided in the tractor a foot pedal for controlling the brakes, a clutch pedal, and a hand-operated throttle lever. In preparing the tractor for the conversion the two steerable front wheels, the dead axle by which the same are carried, and the steering mechanism are each removed, and one of the tractor's two rear traction wheels is also removed, right or left, as the case may be, depending upon whether the tractor is to serve as the left section or the right section, respectively, of the yoked span. In addition, there is deleted from the tractor the differential spider together with the final drive axle and the housing therefor of the particular traction wheel which has been removed. With this drive axle removed, there remains within the differential housing the meshed spiral bevel pinion and wheel gear 18 and 17, respectively, of the main drive, the meshed wheel and pinion gears 15 and 16 of the functioning final drive, and a pinion gear 14 of the other or deleted final drive which is, perforce, a counterpart of the pinion gear 15. A wheel gear 31, hereinafter more specifically referred to, meshes this latter pinion gear and while the gear set— pinion 14 and gear wheel 31—no longer functions as a final drive, the wheel element 31 as well as the pinion element 14 each are used in the conversion.

In making my conversion the respective tractors, denoted generally by the numerals 20 and 21, are each provided with a chain case, as 22 and 23, and each said chain case has a length approximating the length of the tractor and is sectionally of a rectangular configuration fairly narrow in width and quite deep. Such chain cases each occupy a plane parallel with the longitudinal median plane of the respective tractor, and are located along the inner side thereof. This is to say that the tractor which is adapted to function as the starboard unit of the yoked span has its chain case placed at the left side thereof whereas the tractor which is adapted to function as the port unit of the yoked span has its chain case placed at the right side thereof. Each chain case has two openings in that side thereof which faces the related tractor, and one such opening lies adjacent the front end of the case while the other opening lies adjacent the rear end in axial registration with the opening of the tractor's differential housing which is normally closed by the deleted housing for the tractor's non-used final drive. Fitted in these registering openings and presenting flanges 24 and 25 (Fig. 11) which are bolted one to the tractor's differential housing and the other to the chain case are necks 26 and 27 of a thimble member 28, and journal-mounted within the hollow center of this thimble with its ends protruding therebeyond is a jack-shaft 30. The inner end of this jack-shaft, by which I mean the end projecting into the differential housing of the tractor, has keyed thereon said counterpart 31 of the tractor's final drive gear, and on the other end there is keyed a sprocket wheel 32.

At the front of the chain case the face thereof in which the front side opening occurs is reinforced by a plate 33 welded to the chain case as an integral part thereof, and bolted to this face plate is a bearing 34, hereinafter termed an inboard bearing, acting in conjunction with a second bearing 35 hereinafter termed an outboard bearing, to support a shaft 36 functioning as a live front axle for the conversion. This outboard bearing finds its support in a hollow boss 37 projecting outwardly from a flange 38 which extends longitudinally on edge along the outer side of the tractor and is securely bolted to the main frame of the latter, such flange being quite long and also depending well below the main frame. A hollow strut 39 having somewhat of a triangular shape in section runs diagonally from the boss 37 at the outside to the reinforcing plate 33 at the inside, being welded to the former and bolted to the latter. The plate 33, together with the flange 38 and its outwardly projecting boss 37, and the strut which runs diagonally from the boss 37 at the outside to the plate 33 at the inside, produces a sub-frame serving as a fixed adjunct of the main frame. While these several parts produce, in effect, a unitary structure, it is for ease of assembly that the strut is bolted to the plate 33, and the latter welded to the chain case. As complements of the thimble member 28 and the strut 39 in securing each chain case rigidly to the main frame of the related tractor, there are provided two brackets 40 and 41, one located central to the length and the other at the extreme front end of the case.

Within the chain case a sprocket wheel 42 is keyed to the inner end of said front axle 36, being driven by a chain 43 which passes power forwardly from said engine-driven rear sprocket wheel 32. A front traction wheel 44 is mounted upon the outer end of said front axle 36 and becomes a front-end in-line complement of the tractor's rear traction wheel 46.

Proceeding now to describe the structural arrangement by which the two converted tractor units are yoked for relative oscillatory motion, it will be seen from an inspection of the drawings that there is provided a transverse pivot shaft 45 extending substantially the full width of the yoked units in a position intermediate the front and rear axles immediately below the two chain cases. A centrally placed shoulder 47 divides the shaft into a large-diameter portion 48 at one end and a small-diameter portion 49 at the other end, and providing a rotary journal for said small end 49 is a sleeve 50 made rigid with one of the two tractor units and extending approximately the full width thereof—main frame and chain combined. The shoulder 47 bears against the inner end of this sleeve while the outer end is engaged by a thrust collar 51. In making the sleeve rigid, the same has one end clamped between a cap 52 and saddling blocks 53, with the blocks being welded to the underside of the related chain case, in this instance the chain case 22, and has its other end welded to a bracket 54 which is in turn bolted to the underside of the hollow case 19. The large end of the pivot shaft is clamped between a bolster 55 and a saddling cap 56, and such bolster is made rigid with the other of the two tractor units by welding to the bolster a bracket 57 which is bolted to the underside of the related hollow case 19, and by bolting the bolster to blocks 58 welded to the underside of the related chain case, in this instance the chain case 23. A link 60 is connected to the rear end of the block 53 for pivotal movement about a vertical axis, and a draw-bar 61 is swivelled to this link.

It will be seen that the mounting of the pivot shaft establishing a fixed spacing between the tractor units at the rear end thereof, and at the front end I maintain this same spacing by means of two or more vertically spaced rollers 62 journaled for rotation about a respective longitudinal horizontal axis in cut-outs 63 (Fig. 12) provided in a web 64 extending forwardly from one of the two chain cases, these rollers tracking against the facing sides of a restraining channel 65 rigid with the other chain case. A lug 66 which is provided on the front face of the former such chain case, and working between two stops 67 extending laterally from the channel 65, limits the oscillatory motion of the yoked tractors.

At the substantial rear end of the tractor convenient to the several controls for both of the yoked tractors there is provided a bucket seat 70. Giving support to this seat is a frame-work 71 (see Fig. 13) rising from a base plate 69 of a width sufficient to span both of the chain cases, and there is cemented or otherwise secured to the underside of this base plate two pads, as 72 and 73, each composed of leather, rubber, or other like or suitable cushioning material. The base plate is sustained upon the upper end of a bar-stick 74, and such bar-stick runs diagonally forward from the seat in the space between the two chain cases and at its lower end is pivoted to the pivot shaft 45. As will be apparent, oscillatory motion of the yoked tractors as the same ride over uneven terrain causes the seat to move in concert with the particular tractor whose rear end, at any given moment, occupies a position superior to the rear end of the other tractor, one or the other of the two pads resting at all times upon its related chain case.

It is thought that the invention will have been clearly understood from the foregoing detailed description of my now preferred illustrated embodiment. Various changes in the details of construction may self-evidently be resorted to without departing from the spirit of the invention, wherefor it is my intention that no limitations be implied and that the hereto annexed claims be given the broadest interpretation to which the employed language fairly admits.

What I claim is:

1. A yoked span of tractors comprising, in combination: two matching tractor units disposed in proximate side-by-side relation each providing a main frame with an engine at the front end thereof, having a single rear ground wheel and a single front ground wheel at the outside of each tractor unit, and along the inside having a respective chain case extending approximately the full length of each main frame and rigidly connected therewith, a rear axle for each rear ground wheel powered through a final drive from the engine, a respective live axle for each of said front ground wheels extending by its inner end into the chain case, a respective sub-frame secured rigidly to each main frame and to the related chain case and providing inboard and outboard bearings for the respective front axle, a trunnion shaft having one end rigidly clamped to the main frame and to the chain case of one of the two tractor units and having the other end journaled in bearings fixed to the main frame and to the chain case of the other tractor unit and supporting the tractor units for relative oscillatory motion about a transverse horizontal axis lying below the main frames and between the front and rear ground wheels, a jackshaft for each tractor unit extending into the rear end of the related chain case and powered from the related engine by a counterpart of the related final drive, a respective sprocket wheel for each front axle and for each jackshaft fast to the end thereof which lies within the chain case, a transfer chain housed in each chain case and passing power forwardly from the sprocket wheel at the rear to the sprocket wheel at the front, and sets of interfitting means carried by the chain cases of the two tractor units in a position longitudinally spaced from said trunnion shaft and acting in complement with the trunnion shaft as a means of holding the tractor units to oscillatory movement in parallel planes.

2. A yoked span of tractors comprising, in combination: two matching tractor units disposed in proximate side-by-side relation each providing a main frame with an engine at the front end thereof, having a single rear ground wheel and a single front ground wheel at the outside of each tractor unit, and along the inside having a respective chain case extending approximately the full length of each main frame and rigidly connected therewith, a rear axle for each rear ground wheel powered through a final drive from the engine, a respective live axle for each of said front ground wheels extending by its inner end into the chain case, a respective sub-frame secured rigidly to each main frame and to the related chain case and providing inboard and outboard bearings for the respective front axle, a trunnion shaft operatively interconnecting the two tractor units supporting the latter for relative oscillatory motion about a transverse horizontal axis located between the front and rear ground wheels, a jack-shaft for each tractor unit extending into the rear end of the related chain case and powered from the related engine by a counterpart of the related final drive, a respective sprocket wheel for each front axle and for each jack-shaft fast to the end thereof which lies within the chain case, a transfer chain housed in each chain case and passing power forwardly from the sprocket wheel at the rear to the sprocket wheel at the front, and sets of interfitting means carried by the chain cases of the two tractor units in a position longitudinally spaced from said trunnion shaft and acting in complement with the trunnion shaft as a means of holding the tractor units to oscillatory movement in parallel planes.

3. A yoked span of tractors comprising, in combination: two matching tractor units disposed in proximate side-by-side relation each providing a main frame with an engine at the front end thereof, having a single rear ground wheel and a single front ground wheel at the outside of each tractor unit, and along the inside having a respective hollow case extending approximately the full length of each main frame and rigidly connected therewith, a rear axle for each rear ground wheel powered through a final drive from the engine, a respective live axle for each of said front ground wheels extending by its inner end into the hollow case, a respective subframe secured rigidly to each main frame and to the related hollow case and providing inboard and outboard bearings for the respective front axle, a trunnion shaft having one end rigidly clamped to the main frame of one of the two tractor units and having the other end journaled in bearings fixed to the main frame of the other tractor unit and supporting the tractor units for relative oscillatory motion about a transverse horizontal axis lying below the main frames and between the front and rear ground wheels, a jack-shaft for each tractor unit extending into the rear end of the related case and powered by a counterpart of the related final drive, means housed in said hollow cases passing power forwardly from the jack-shaft to the front axle, and sets of interfitting means provided by the two tractor units in a position longitudinally spaced from said trunnion shaft and acting in complement with the trunnion shaft as a means of holding the tractor units to oscillatory movement in parallel planes.

4. A yoked span of tractors comprising, in combination: two matching tractor units disposed in proximate side-by-side relation each providing a main frame with an engine at the front end thereof, having a single rear ground wheel and a single front ground wheel at the outside of each tractor unit, and along the inside having a respective hollow case extending approximately to full length of each main frame and rigidly connected therewith, a rear axle for each rear ground wheel powered through a final drive from the engine, a respective live axle for each of said front ground wheels extending by its inner end into the hollow case, a respective subframe secured rigidly to each main frame and to the related hollow case and providing inboard and outboard bearings for the respective front axle, means operatively interconnecting the two tractor units supporting the same for relative oscillatory motion about a transverse horizontal axis located between the front and rear ground wheels, a jack-shaft for each tractor unit extending into the rear end of the related case and powered by a counterpart of the related final drive, means housed in said hollow cases passing power forwardly from the jack-shaft to the front axle, and sets of interfitting means provided by the two tractor units in a position longitudinally spaced from said trunnion shaft and acting in complement with the trunnion shaft as a means of holding the tractor units to oscillatory movement in parallel planes.

5. A yoked span of tractors comprising, in combination: two matching tractor units disposed in proximate side-by-side relation each providing a main frame with an engine at the front end thereof, having a single rear ground wheel and a single front ground wheel at the outside of each tractor unit, and along the inside having a respective chain case extending approximately the full length of each main frame and rigidly connected therewith, a rear axle for each rear ground wheel powered through a final drive from the engine, a respective live axle for each of said front ground wheels extending by its inner end into the chain case, a respective sub-frame secured rigidly to each main frame and to the related chain case and providing inboard and outboard bearings for the respective front axle, a trunnion shaft having one end section rigidly clamped to the main frame and to the chain case of one of the two tractor units and having the other end section journaled in bearings fixed to the main frame and to the chain case of the other tractor unit and supporting the tractor units for relative oscillatory motion about a transverse horizontal axis lying below the main frames and between the front and rear ground wheels, means being provided on said latter end section of the trunnion shaft resisting thrust in both axial directions, a jack-shaft for each tractor unit extending into the rear end of the related chain case and powered by a counterpart of the related final drive, a transfer chain housed in each chain case and passing power forwardly from a sprocket wheel on the jack-shaft to a sprocket wheel on the inner end of the front axle, and sets of interfitting means carried by the chain cases at the substantial front ends thereof acting in complement with the trunnion shaft as a means of holding the tractor units to oscillatory movement in parallel planes fixed with respect to one another.

6. A yoked span of tractors comprising, in combination: two matching tractor units disposed in proximate side-by-side relation each providing a main frame with an engine at the front end thereof, having a single rear ground wheel and a single front ground wheel at the outside of each tractor unit, and along the inside having a respective chain case extending approximately the full length of each main frame and rigidly connected therewith, a rear axle for each rear ground wheel powered through a final drive from the engine, a respective live axle for each of said front ground wheels extending by its inner end into the chain case, a respective subframe secured rigidly to each main frame and to the related chain case and providing inboard and outboard bearings for the respective front axle, a trunnion shaft having one end rigidly clamped to the main frame and to the chain case of one of the two tractor units and having the other end journaled in bearings fixed to the main frame and to the chain case of the other tractor unit and supporting the tractor units for relative oscillatory motion about a transverse horizontal axis lying below the main frames and between the front and rear ground wheels, means being provided on said latter end of the trunnion shaft resisting thrust in both axial directions, a jack-shaft for each tractor unit extending into the rear end of the related chain case and powered by a counterpart of the related final drive, a transfer chain housed in each chain case and passing power forwardly from a sprocket wheel on the jack-shaft to a sprocket wheel on the inner end of the front axle, a bar received between the two chain cases with its lower end pivoted to the trunnion shaft and extending diagonally rearwardly therefrom with its upper end exposed above the chain cases, a cross-member on said exposed end, a driver's seat on said cross-member, and pads on the underside of said cross-member arranged to bear upon one or the other of the two chain cases according as to which chain case occupies a superior elevation.

7. Structure according to claim 6 in which the pads are composed of a cushioning material.

8. A yoked span of tractors comprising, in combination: two matching tractor units disposed in proximate side-by-side relation each providing a main frame with an engine thereon, having a single rear ground wheel and a single front ground wheel at the outside of each tractor unit, and along the inside having a respective hollow case extending approximately the full length of each main frame and rigidly connected therewith, a live rear axle for each rear ground wheel and a live shaft co-axial with each axle and extending into the rear end of the related said case, the axle and the shaft being driven by the related engine, a respective live axle for the front ground wheel of each unit having its inner end extending into the front end of the hollow case, a respective mount for each of said front ground wheels rigidly secured both to the main frame and to the hollow case and providing an inboard bearing for the front axle located adjacent the case and an outboard bearing for the axle located outside the main frame, means operatively interconnecting the two tractor units supporting the same for relative oscillatory motion about a transverse horizontal axis located between the front and rear ground wheels, and transfer means housed in each hollow case passing the power forwardly from said live shaft to the inner end of the related front axle.

9. Structure according to claim 8 in which the wheel mount includes a strut secured by its outer end to the outboard bearing and extending inwardly therefrom to the hollow case with said inner end anchored to the case at a point spaced well below the inboard bearing.

10. The structure recited in claim 9 in which said strut is hollow.

11. Structure according to claim 8 having a seat for the driver located at the rear on the substantial longitudinal median line of the yoked span, and means supporting said seat so as to have the same maintain a position which is substantially constant with respect to whichever rear end of the two tractor units occupies a superior position.

12. A yoked span of tractors comprising, in combination: two matching tractor units disposed in proximate side-by-side relation each providing a main frame with an engine thereon, and having a single rear ground wheel and a single front ground wheel at the outside of each tractor unit, a live rear axle for each rear ground wheel driven by the related engine, a respective live axle for the front ground wheel of each unit, means operatively interconnecting the two tractor units supporting the same for relative oscillatory motion about a transverse horizontal axis located between the front and rear ground wheels, transfer means passing the power forwardly from each of said rear axles to the related front axle, a seat for the driver located at the rear on the substantial longitudinal median line of the yoked span, and means supporting said seat so as to have the same maintain a position which is substantially constant with respect to whichever rear end of the two tractor units occupies a superior position.

13. Structure according to claim 12 in which the seat-supporting means comprises a bar carried by the yoked span for pivotal movement about an axis coinciding with the oscillatory axis of the yoked span and extending upwardly and rearwardly therefrom with the upper end exposed and giving support to the seat, each of said tractor units presenting at its rear end a respective bearing surface which is caused to rise and fall as the related tractor unit oscillates, and means carried by said bar arranged to bear upon one or the other of said bearing surfaces according as to which of the two bearing surfaces occupies a superior elevation.

14. Structure according to claim 13 in which the surfaces of said bar-carried bearing means which bear upon said bearing surfaces of the tractor units are faced with pads of a cushioning material.

15. A yoked span of tractors comprising, in combination: two matching tractor units disposed in proximate side-by-side relation each providing a main frame with an engine thereon, having a single rear ground wheel and a single front ground wheel at the outside of each tractor unit, and along the inside having a respective hollow case extending approximately the full length of each main frame and rigidly connected therewith, a live rear axle for each rear ground wheel driven by the related engine, a respective live axle for the front ground wheel of each unit, means operatively interconnecting the two tractor units supporting the same for relative oscillatory motion about a transverse horizontal axis located between the front and rear ground wheels, sets of interfitting means carried by the hollow cases at the front ends thereof acting in complement with said supporting means as a means of holding the tractor units to oscillatory movement in parallel planes fixed with respect to one another, and transfer means operatively interconnecting the rear axle with the front axle for passing power forwardly from said rear axle to the front axle, said transfer means being received in part within the hollow case.

16. A yoked span of tractors comprising, in combination: two matching tractor units disposed in proximate side-by-side relation each providing a main frame with an engine thereon, having a single rear ground wheel and a single front ground wheel at the outside of each tractor unit, and along the inside having a respective hollow case extending approximately the full length of each main frame and rigidly connected therewith, a live rear axle for each rear ground wheel driven by the related engine, a respective live shaft also driven by each engine and extending into the rear end of the related hollow case, a respective live axle for the front ground wheel of each unit having its inner end extending into the front end of the related hollow case, a respective mount for each of said front ground wheels rigidly secured both to the main frame and to the hollow case and providing an inboard bearing for the front axle located adjacent the case and an outboard bearing for the axle located outside the main frame, means operatively interconnecting the two tractor units supporting the same for relative oscillatory motion about a transverse horizontal axis located between the front and rear ground wheels, and transfer means housed in each hollow case passing the power forwardly from said live shaft to the inner end of the related front axle.

17. A yoked span of tractors comprising, in combination: two matching tractor units disposed in proximate side-by-side relation each providing a main frame with an engine thereon, having a single rear ground wheel and a single front ground wheel at the outside of each tractor unit, and along the inside having a respective hollow case extending approximately the full length of each main frame and rigidly connected therewith, a live rear axle for each rear ground wheel driven by the related engine, a respective live shaft also driven by each engine and extending into the rear end of the related hollow case, a respective live axle for the front ground wheel of each unit having its inner end extending into the front end of the related hollow case, a respective mount for each of said front ground wheels rigidly secured both to the main frame and to the hollow case and providing bearings for both the inner and the outer ends of said front axle, means operatively interconnecting the two tractor units supporting the same for relative oscillatory motion about a transverse horizontal axis located between the front and rear ground wheels, and transfer means housed in each hollow case passing the power forwardly from said live shaft to the inner end of the related front axle.

References Cited in the file of this patent

UNITED STATES PATENTS

| | | |
|---|---|---|
| 1,254,057 | Moore | Jan. 22, 1918 |
| 1,430,251 | Parker | Sept. 26, 1922 |
| 1,675,013 | Young | June 26, 1928 |
| 2,254,360 | Frudden | Sept. 2, 1941 |
| 2,678,105 | Peterson | May 11, 1954 |